United States Patent

[11] 3,617,881

[72] Inventor John J. McCormick
Beaverton, Oreg.
[21] Appl. No. 879,393
[22] Filed Nov. 24, 1969
[45] Patented Nov. 2, 1971
[73] Assignee Tektronix, Inc.
Beaverton, Oreg.

[54] DC VOLTAGE-TESTING AND CURRENT-MEASURING CIRCUIT INCLUDING DIFFERENTIAL AMPLIFIER
11 Claims, 3 Drawing Figs.
[52] U.S. Cl. .................................................. 324/57 R, 324/123, 330/69
[51] Int. Cl. ...................................................... G01r 27/00
[50] Field of Search ........................................... 324/57, 60, 62, 123; 330/38, 30, 69, 84

[56] References Cited
UNITED STATES PATENTS
3,435,375 3/1969 Miller, Jr. ...................... 331/110

Primary Examiner—Edward E. Kubasiewicz
Attorney—Buckhorn, Blore, Klarquist & Sparkman ABSTRACT: A circuit for measuring DC current flowing through a device under test at a known applied DC reference voltage is described in which a high-gain DC coupled differential amplifier is employed with a positive input connected to an adjustable source of such reference voltage and a negative input connected to the test device and to its output through a feedback resistor. The feedback resistor is initially short circuited by a first switch to produce on the output and negative input a DC voltage corresponding to the reference voltage because of the high gain and causes a DC current signal to flow through the device under test. Then, the first switch is subsequently opened to cause the current signal to be transmitted through the feedback resistor, rather than such switch, and produce a corresponding voltage step signal at the output of the amplifier. This voltage step signal is proportional to the current signal and is transmitted through a coupling capacitor and an output amplifier to a voltage measurement device. The output terminal of such capacitor may be connected to ground through a second switch, which is initially closed to provide the step signal with a quiescent voltage level of zero, and is opened immediately before the opening of the first switch to prevent "droop" in the top of such step signal.

PATENTED NOV 2 1971

3,617,881

JOHN J. McCORMICK
INVENTOR

BY
BUCKHORN, BLORE, KLARQUIST & SPARKMAN
ATTORNEYS

DC VOLTAGE-TESTING AND CURRENT-MEASURING CIRCUIT INCLUDING DIFFERENTIAL AMPLIFIER

BACKGROUND OF THE INVENTION

The subject matter of the present invention relates generally to the testing of electronic devices by applying a known DC reference voltage thereto and measuring the resulting DC current signals of such devices and, in particular, to a low-level DC current measuring circuit including a high-gain, DC coupled differential amplifier in which the DC reference voltage is applied to a positive input and the device under test is connected to the negative input along with a feedback resistor whose other terminal is connected to the output of the amplifier, and a switch is connected across such feedback resistor. The switch is initially closed to short circuit the feedback resistor, thereby producing on the output and the negative input a DC voltage corresponding to the reference voltage, which causes a DC current to flow through the device under test. Then, the switch is subsequently opened to cause such DC current formerly flowing through such switch to flow through the feedback resistor and produce a step voltage signal proportional to such signal current at the output of the amplifier.

The present circuit has the advantage that it does not load the device under test with a low impedance which would otherwise tend to lower the output load impedance of the device under test. In addition, the present circuit has the advantage that it does not distort the DC signal currents measured so that such circuit is capable of measuring low DC currents, for example, from about 10 nanoamperes up to about 100 milliamperes, over a wide range of reference voltages, for example, from +100 volts to −100 volts.

The current-measuring circuit of the present invention is especially useful in measuring the characteristics of semiconductor devices, such as diodes, transistors, and monolithic integrated circuits. For example, the leakage current of a semiconductor device can be measured with great accuracy at several different DC operating voltages.

Conventional DC current-measuring devices have been in the form of ammeters, connected in series with the output of the test device, and have a voltage drop so that it is not possible to know the exact DC reference voltage applied to the device under test, or have been in the form of voltmeters connected in parallel with the device under test which give the correct applied voltage but load such test device with the meter resistance so that the DC signal current of the device cannot be accurately measured. Both of these disadvantages are overcome in the circuit of the present invention. Thus, the precise DC voltage which is applied to the device under test is known because it corresponds to the DC reference voltage applied to the positive polarity input of the differential amplifier. Also, such amplifier does not load the device under test because it has an extremely high input impedance and, as a result, the step voltage signal output is directly proportional to the DC signal current times the feedback resistance.

It is therefore one object of the present invention to provide an improved DC voltage testing and current-measuring circuit which is capable of accurately measuring low values of DC current over a wide range of known DC voltages applied to the device under test.

A further object of the present invention is to provide such a current-measuring circuit in which the applied DC voltage is known precisely and which has an extremely high input impedance so that it does not load the device under test.

Another object of the present invention is to provide such a current-measuring circuit which is extremely accurate and does not distort the measurement signal over a wide range of DC signal currents.

An additional object of the present invention is to provide such a measuring circuit which converts the DC current being measured into a step voltage proportional to such current which is measured on a cathode ray oscilloscope or other voltage measurement device.

BRIEF DESCRIPTION OF THE DRAWINGS

Other objects and advantages of the present invention will be apparent from the following detailed description of a preferred embodiment thereof and from the attached drawings of which.

DESCRIPTION OF THE PREFERRED EMBODIMENT

Figure 1:
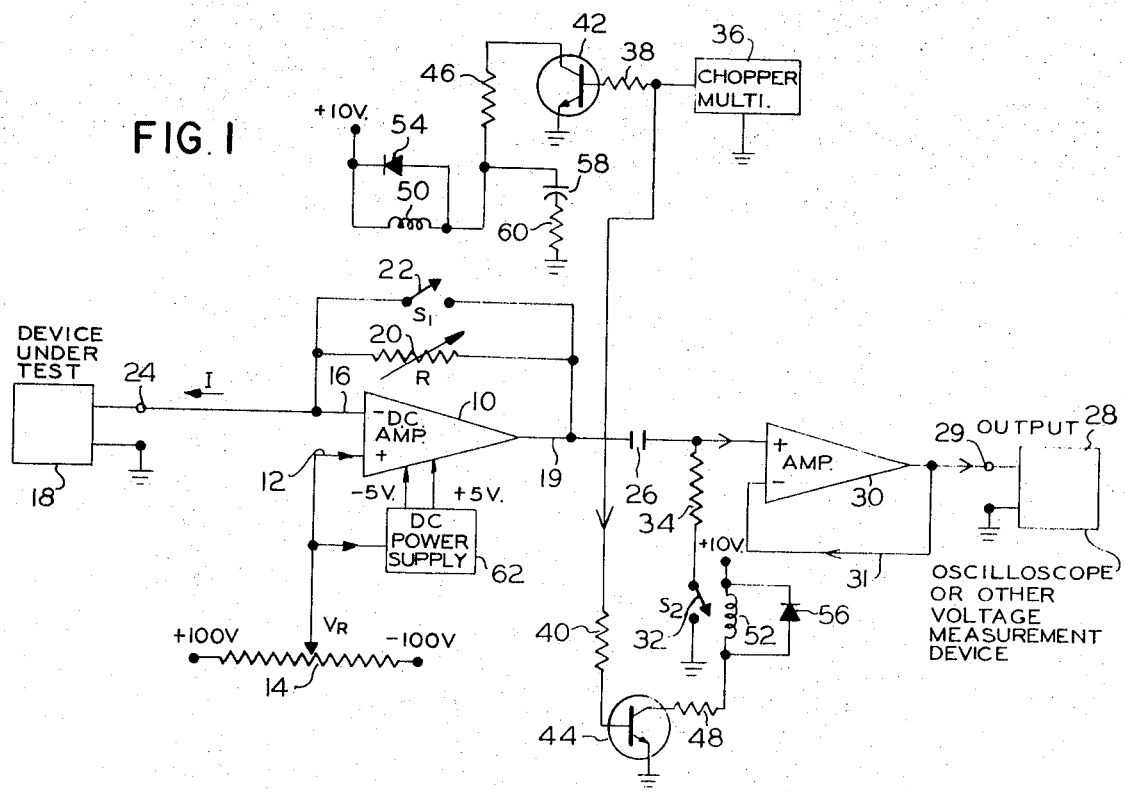
FIG. 1 is a schematic diagram of one embodiment of the DC voltage testing and current measuring circuit of the present invention.

As shown in FIG. 1, one embodiment of the current measuring circuit of the present invention includes an input amplifier 10 which is a differential amplifier having a positive polarity input 12 connected to a source of variable DC reference voltage $V_R$ at the movable arm of a potentiometer 14 having its end terminals connected respectively to DC supply voltages of +100 and −100 volts. Thus, the potentiometer 14 applies to the input 12 a reference voltage $V_R$ which can be changed over a wide range of +100 to −100 volts by adjusting the movable contact of such potentiometer. Of course, a plurality of fixed resistors of different values and a selecting switch (not shown) may also be employed to provide the voltage divider so that the values of the different reference voltages are of fixed, known values. The negative input 16 of the amplifier 10 is connected to the output of the device under test 18, which can be a transistor or other semiconductor device whose characteristics are being measured. The output 19 of the differential amplifier 10 is connected to its negative input 16 through a feedback resistor 20 which, for simplicity, is shown as a variable resistor but which, in reality, can be a plurality of fixed resistors which are selectively switched into the feedback path to vary the feedback resistance from 10 ohms to 10 megohms. It should be noted that the amplifier 10 is a high-gain, DC coupled amplifier and resistor 20 provides negative feedback so that the differential amplifier is connected as an operational amplifier whose output is equal to its input current times its feedback resistance plus $V_R$.

A first switch 22 is connected in parallel with the feedback resistor 20 and is initially closed to normally short circuit the output of the amplifier to its negative input. When so connected, the amplifier 10 has an extremely high input impedance and due to its high internal gain, a DC voltage is produced at its output 19 and its negative input 16, substantially equal to the reference voltage $V_R$ applied to its positive input 12. Thus, the reference voltage is applied to the device under test 18 causing a DC test current I to flow through the output lead 24 of such device. This DC signal current is supplied by amplifier 10 through the switch 22 from the output 19 of the amplifier and no appreciable amount of such current flows through the negative input 16 of the amplifier due to its extremely high input impedance.

In order to make a test measurement, the first switch 22 is moved from its closed position to the open position shown. The potential of the input 16 remains at the reference voltage $V_R$ due to the feedback current flowing through resistor 20, instead of through switch 22 as previously when such switch was closed, and the resulting DC test current I flowing through device 18 now is transmitted through the feedback resistor 20. As a result, this signal current produces voltage step signal $V_X$ on output 19 equal to I times R, where R is the resistance of such feedback resistor. This voltage step signal is added to the DC reference voltage $V_R$ initially on the output 19 of amplifier 10. An AC coupling means in the form of a series capacitor 26 of about 2.4 microfarads is connected to the output 19 of amplifier 10 to transmit only the step voltage signal $V_X$ to a suitable voltage measurement device 28, such as a cathode-ray oscilloscope, at the output terminal 29 of the circuit.

An output amplifier 30 of high input impedance is connected between the output plate of capacitor 26 and the measurement device 28 to prevent rapid discharge of the coupling capacitor and a resulting "droop" in the top of the step voltage $V_x$. Amplifier 30 may be in the form of a differential amplifier whose negative input is short circuited through a feedback conductor 31 to its output and whose positive input is connected to the capacitor 26 to provide an amplifier of +1 unity gain and an extremely high input impedance.

A second switch 32 is provided for initially connecting the output plate of the capacitor 26 to ground or other DC reference point through a small shunt resistor 34 of about 10 ohms. This second switch 32 is initially closed so that the quiescent DC voltage level on the positive input of amplifier 30 is always zero volts, regardless of changes in the DC reference voltage $V_R$ at the output 19 of amplifier 10. The second switch 32 is opened, immediately prior to the movement of switch 22 to its open position, to effectively disconnect the output plate of capacitor 26 from the low resistance path to ground provided by shunt resistor 34 and, instead, to connect such capacitor plate only through the extremely high input resistance of amplifier 30. This prevents the step voltage transmitted through the AC coupling capacitor 26 from decaying rapidly to zero and producing a "droop" in the top of such step voltage. Instead, the R times C time constant of the coupling capacitor 26 and the input resistance of amplifier 30 is extremely long to maintain the step voltage at its maximum value $V_x$ for sufficient time to enable measurement of the voltage $V_x$ on the oscilloscope or other measurement device 28. Once this measurement is accomplished, both switches 22 and 32 are again closed to quickly discharge the capacitor 26 so that its output plate again returns to zero and its input plate returns to the reference voltage $V_R$.

While the switches 22 and 32 may be operated manually, an automatic switching system is shown in FIG. 1, including a chopper pulse generator 36 which may be an astable multivibrator having its output connected through coupling resistors 38 and 40, of 1 kilohm each, to the bases of switch driver transistors 42 and 44, respectively. The driver transistors 42 and 44 are both NPN-type transistors having their emitters grounded and their collectors connected through load resistors 46 and 48, respectively, of 160 ohms each, to one terminal of the solenoid-type switch actuating coils 50 and 52, respectively. The other terminal of each of the solenoid coils is connected to a positive DC voltage source of about +10 volts, and shunting diodes 54 and 56 are connected across such coils with a polarity so that the switches are closed only by positive going chopper signals and are opened during negative going chopper signals since such signals are inverted by the driver transistors. It should be noted that the solenoid actuated switches may be magnetic reed switches.

A time delay network, including a delay capacitor 58, of about 1 microfarad, in series with a resistor 60, of about 51 ohms, is connected from the common terminal of resistor 46 and coil 50 to ground in order to delay the opening of switch 22 until after switch 32 is opened. This prevents any attenuation of the step voltage signal transmitted through the coupling capacitor 26 due to premature discharge through the low shunt resistor 34 before switch 32 is opened. A DC power supply 62 is connected at its input to the reference voltage $V_R$ at the input 12 of amplifier 10 so that such power supply "floats" on the reference voltage as such reference voltage is adjusted by potentiometer 14. The power supply provides reference voltages of +5 volts and −5 volts to the differential amplifier 10.

Figure 3:
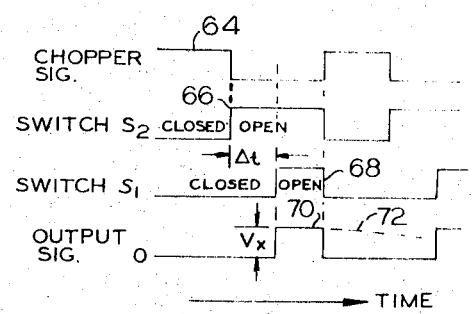
FIG. 3 is a diagram of the waveforms produced in the circuit of FIG. 1.

As shown in FIG. 3, a rectangular chopper signal 64 is supplied at the output of the chopper multivibrator 36. The positive going portions of chopper signal 64 are inverted by transistors 42 and 44 and applied as negative signals to solenoid coils 50 and 52 to close the switches 22 and 32. The negative going portions of the chopper signal 64 are inverted and transmitted as positive signals through diodes 54 and 56 to deenergize the coils 50 and 52 and cause the switches 22 and 32 to open. Thus, the switch voltage 66 across the second switch 32 increases upon the opening of such switch and, after a time delay $\Delta t$, the switch voltage 68 of the first switch 22 increases in value upon its opening. The time delay is provided by the delay network 58 and 60 since capacitor 58 is charged by the negative going signal corresponding to the positive chopper pulse, and must discharge through resistor 60 before the switch coil 50 is deenergized.

A positive step voltage output signal 70 is produced at the output terminal of the amplifier 30 at a time corresponding to the opening of the first switch 22. The maximum voltage amplitude $V_x$ of the output signal 70 is proportional to the product of the signal current I flowing through the output 24 of the device under test 18 times the resistance R of feedback resistor 20. Since the resistance of the feedback resistor is known, the output voltage amplitude is linearly proportional to the amplitude of the DC current I flowing through the device under test. As indicated by the dotted line 72 in FIG. 3, there would be some "droop" or gradular reduction in voltage at the top of the output signal voltage 70 due to the discharging of the coupling capacitor 36 through the high input impedance of the amplifier 30. However, the voltage measurement is taken by the oscilloscope 28 near the leading edge of such output signal so that the switches 22 and 32 are again closed by the chopper terminating the output signal before any appreciable droop occurs.

Figure 2:
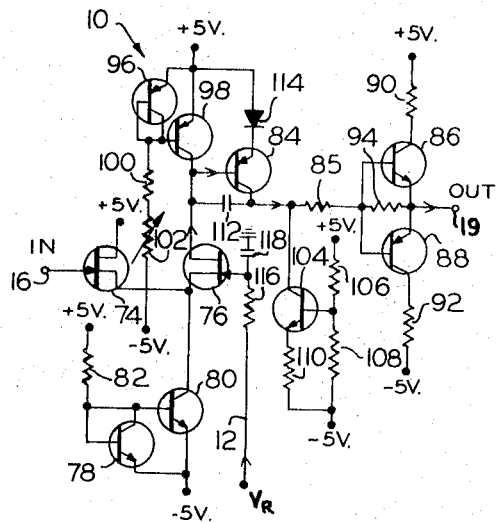
FIG. 2 is a schematic diagram of a differential amplifier which may be employed as the input amplifier in the circuit of FIG. 1.

As shown in FIG. 2, one embodiment of the differential amplifier 10 of FIG. 1 includes a pair of field-effect transistors 74 and 76 having their gates respectively connected to inputs 16 and 12 of the amplifier. These field-effect transistors provide the differential amplifier with an extremely high input impedance so that it does not appreciably load the device under test. The field-effect transistors 74 and 76 have their sources connected n common at the output of a current source formed by a pair of NPN-type bipolar transistors 78 and 80. Thus, transistors 78 and 80 have their emitters connected in common to the −5 volt DC supply and their bases connected in common through a load resistor 82 of 9.31 kilohms to the +5 volt DC supply. The collector of transistor 78 is shorted to its base to operate it as a diode in parallel with the emitter junction of transistor 80 to maintain constant its emitter-to-base voltage.

The drain of the first field-effect transistor 74 is connected to the +5 volt DC supply, while the drain of the second field-effect transistor 76 is connected as an output to the base of an inverted amplifier transistor 84 of PNP-type. The collector of the inverter transistor 84 is connected through a coupling resistor 85 of 10 ohms to the bases of a pair of emitter follower transistors 86 and 88 which are of NPN- and PNP-type, respectively, to provide complementary symmetry with their emitters connected in common to the output terminal 19 of the amplifier 10. The collectors of transistors 86 and 88 are connected respectively to the +5 and −5 volt DC supplies through load resistors 90 and 92, respectively, of 10 ohms each. A bias resistor 94 of 1.6 kilohms is connected between the common terminal of the bases and the common terminal of the emitters of transistors 86 and 88.

The inverter amplifier transistor 84 is quiescently biased in a conductive state by base current supplied by a pair of PNP-type transistors 96 and 98 connected as a constant-current source with their emitters connected in common to the +5 volt DC supply voltage. The bases of transistors 96 and 98 are connected in common and to a −5 volt DC supply voltage through a fixed load resistor 100 of 15 kilohms and a variable load resistor 102 of 5 kilohms. The collector of transistor 96 is shorted to its base so that it is connected as a diode in parallel with the emitter junction of transistor 98. Another source of constant current is provided by a transistor 104 of NPN-type connected to the collector of the inverter transistor 84 to provide it with a constant collector bias current. The base of transistor 104 is connected between a pair of voltage divider resistors 106 and 108 of 6.34 kilohms and 5.57 kilohms, respectively, whose other terminals are connected to the +5 volt DC supply and the 31 5 volt DC supply, respectively. An emitter bias resistor 110 of 3.01 kilohms is connected between the emitter of transistor 104 and the −5 volt DC supply. A high-frequency bypass capacitor 112 of 0.001 microfarad is connected between the base and collector of the inverter transistor 84, and the emitter of such transistor is connected through a diode 114 to the +5 volt DC supply.

The input terminal 12 of differential amplifier 10 connects the gate of the field-effect transistor 76 to the source of DC reference voltage $V_R$ through a coupling resistor 116 of 100 ohms, and an AC bypass capacitor 118 of 0.01 microfarad is connected between such gate and ground. Thus, it should be noted that the differential amplifier 10 of FIG. 2 is a DC coupled amplifier which produces an output signal on the output terminal 19 which is inverted with respect to the input signal applied to the negative input terminal 16, but which is in phase with respect to the DC reference voltage applied to the positive input terminal 12.

While not shown in detail, the output amplifier 30 of FIG. 1 can also be provided with field-effect transistors at its positive and negative inputs in a similar manner to amplifier 10 in order to increase the input impedance of such output amplifier.

It will be obvious to those having ordinary skill in the art that many changes may be made in the details of the above-described preferred embodiment of the present invention without departing from the spirit of the invention. Therefore, the scope of the invention should only be determined by the following claims.

I claim:
1. Current-measuring circuit, comprising:
   a source of DC reference voltage;
   differential amplifier means of high internal gain having a first input connected to the device under test, a second input connected to said source of DC reference voltage, and an output;
   AC coupling means connected between the output of the differential amplifier and the output terminal of the circuit;
   a feedback resistance connected between the output of the differential amplifier and the first input of said differential amplifier; and
   switch means, including a first switch connected across said feedback resistance, for initially closing said first switch to connect said first input to the output of said differential amplifier through said first switch to produce on said amplifier output and first input a DC voltage corresponding to said reference voltage and cause a test current to flow through the first switch to said device, and for subsequently opening said first switch to cause the test current to flow through said feedback resistance to aid device and produce an output voltage step signal on said output terminal proportional to said test current.

2. A circuit in accordance with claim 1 in which the switch means also includes a second switch connected between the output of the coupling means and ground, said second switch being initially closed and being opened when the output voltage signal is produced.

3. A circuit in accordance with claim 1 in which the source of DC reference voltage is variable and the differential amplifier includes a DC power supply connected to the reference voltage source so that said power supply will float with changes in said reference voltage.

4. A circuit in accordance with claim 1 in which the differential amplifier means is a direct coupled amplifier having a pair of field-effect transistors whose gates are connected as the first and second inputs of negative and positive polarity, respectively, with respect to its output, and having their sources connected together, and an inverter transistor connected between the output of the amplifier and the drain of the transistor whose base is connected as the second input.

5. A circuit in accordance with claim 2 in which the coupling means is a coupling capacitor and which includes a shunt resistor connected between the output plate of said capacitor and the second switch.

6. A circuit in accordance with claim 5 in which the switch means opens the second switch before the first switch.

7. A circuit in accordance with claim 5 which includes another differential amplifier having its positive polarity input connected to the output plate of the coupling capacitor and its negative polarity input connected to its output at the output terminal of the circuit.

8. A circuit in accordance with claim 1 in which the feedback resistance is variable.

9. A circuit in accordance with claim 1 in which a voltage measurement device is connected to said output terminal.

10. A circuit in accordance with claim 9 in which the measurement device is a cathode-ray oscilloscope.

11. A circuit in accordance with claim 6 in which the switches are solenoid actuated and a time delay capacitor is connected to the actuating circuit of the solenoid coil associated with the first switch to delay the opening thereof.

* * * * *

UNITED STATES PATENT OFFICE
CERTIFICATE OF CORRECTION

Patent No. 3,617,881  Dated November 2, 1971

Inventor(s) John J. McCormack

It is certified that error appears in the above-identified patent and that said Letters Patent are hereby corrected as shown below:

In Column 2, line 43, after "output" insert --voltage--;

In Column 4, line 34, "N" should be --in--;

In Column 4, line 61, "constant-current" should be --constant current-- (without a hyphen)

In Column 4, line 75, "315" should be "-5";

In Column 6, claim 1, line 4, "aid" should be --said--;

In the title:

"VOLTAGE-TESTING" should be "VOLTAGE TESTING" (No hyphen)

"CURRENT-MEASURING" should be "CURRENT MEASURING" (No hyphen)

Signed and sealed this 18th day of April 1972.

(SEAL)
Attest:

EDWARD M. FLETCHER, JR.
Attesting Officer

ROBERT GOTTSCHALK
Commissioner of Patents